[12] United States Patent  
Binder et al.

(10) Patent No.: US 8,534,517 B2  
(45) Date of Patent: Sep. 17, 2013

(54) ROOF RACK FOR A MOTOR VEHICLE, AND METHOD FOR PRODUCING A ROOF RACK

(75) Inventors: Hans Binder, Boehmenkirch (DE); Ottmar Binder, Boehmenkirch (DE)

(73) Assignee: Hans und Ottmar Binder GmbH, Oberflachenverdelung, Bohmenkirch (DE)

( * ) Notice: Subject to any disclaimer, the term of this patent is extended or adjusted under 35 U.S.C. 154(b) by 817 days.

(21) Appl. No.: 12/224,519

(22) PCT Filed: Feb. 3, 2007

(86) PCT No.: PCT/EP2007/000933
§ 371 (c)(1),
(2), (4) Date: Aug. 28, 2008

(87) PCT Pub. No.: WO2007/104388
PCT Pub. Date: Sep. 20, 2007

(65) Prior Publication Data
US 2009/0020573 A1 Jan. 22, 2009

(30) Foreign Application Priority Data
Mar. 16, 2006 (DE) .......................... 10 2006 012 050

(51) Int. Cl.
*B60R 9/00* (2006.01)
*B60R 9/04* (2006.01)
(52) U.S. Cl.
USPC .......................................... 224/326; 224/325

(58) Field of Classification Search
USPC ................. 224/325, 326, 322, 309, 317, 319, 224/320, 321, 323, 327, 330; 296/210
See application file for complete search history.

(56) References Cited

U.S. PATENT DOCUMENTS

| 4,055,909 | A | * | 11/1977 | Perry ........................... 40/124.2 |
| 5,497,925 | A | | 3/1996 | Lumpe et al. |
| 5,518,157 | A | | 5/1996 | Evels et al. |
| 5,715,981 | A | * | 2/1998 | Blomberg et al. ............. 224/326 |
| 5,848,743 | A | * | 12/1998 | Derecktor ..................... 224/331 |
| 6,338,428 | B1 | * | 1/2002 | Kawasaki et al. ............. 224/326 |
| 6,415,970 | B1 | * | 7/2002 | Kmita et al. .................. 224/326 |

FOREIGN PATENT DOCUMENTS

| DE | 42 40 080 A1 | 6/1994 |
| DE | 93 15 848 U1 | 11/1994 |
| DE | 43 23 098 A1 | 1/1995 |
| DE | 43 32 524 A1 | 3/1995 |
| DE | 42 40 080 C2 | 4/1995 |
| DE | 102 03 912 C1 | 9/2003 |
| DE | 103 36 901 B3 | 5/2005 |
| EP | 0 645 282 A1 | 3/1995 |
| EP | 1 348 597 A1 | 10/2003 |
| WO | WO-2005/100092 A | 10/2005 |

* cited by examiner

*Primary Examiner* — Adam Waggenspack
(74) *Attorney, Agent, or Firm* — Harness, Dickey & Pierce, P.L.C.

(57) ABSTRACT

The invention relates to a roof railing for motor vehicles, comprising at least one rack bar and at least one support element associated with the rack bar, wherein the rack bar and support element are provided as separate components. According to the invention, the rack bar as well as the support element are provided as extruded components. The invention further relates to a corresponding method.

13 Claims, 6 Drawing Sheets

ROOF RACK FOR A MOTOR VEHICLE, AND METHOD FOR PRODUCING A ROOF RACK

CROSS-REFERENCE TO RELATED APPLICATIONS

Figure 1:
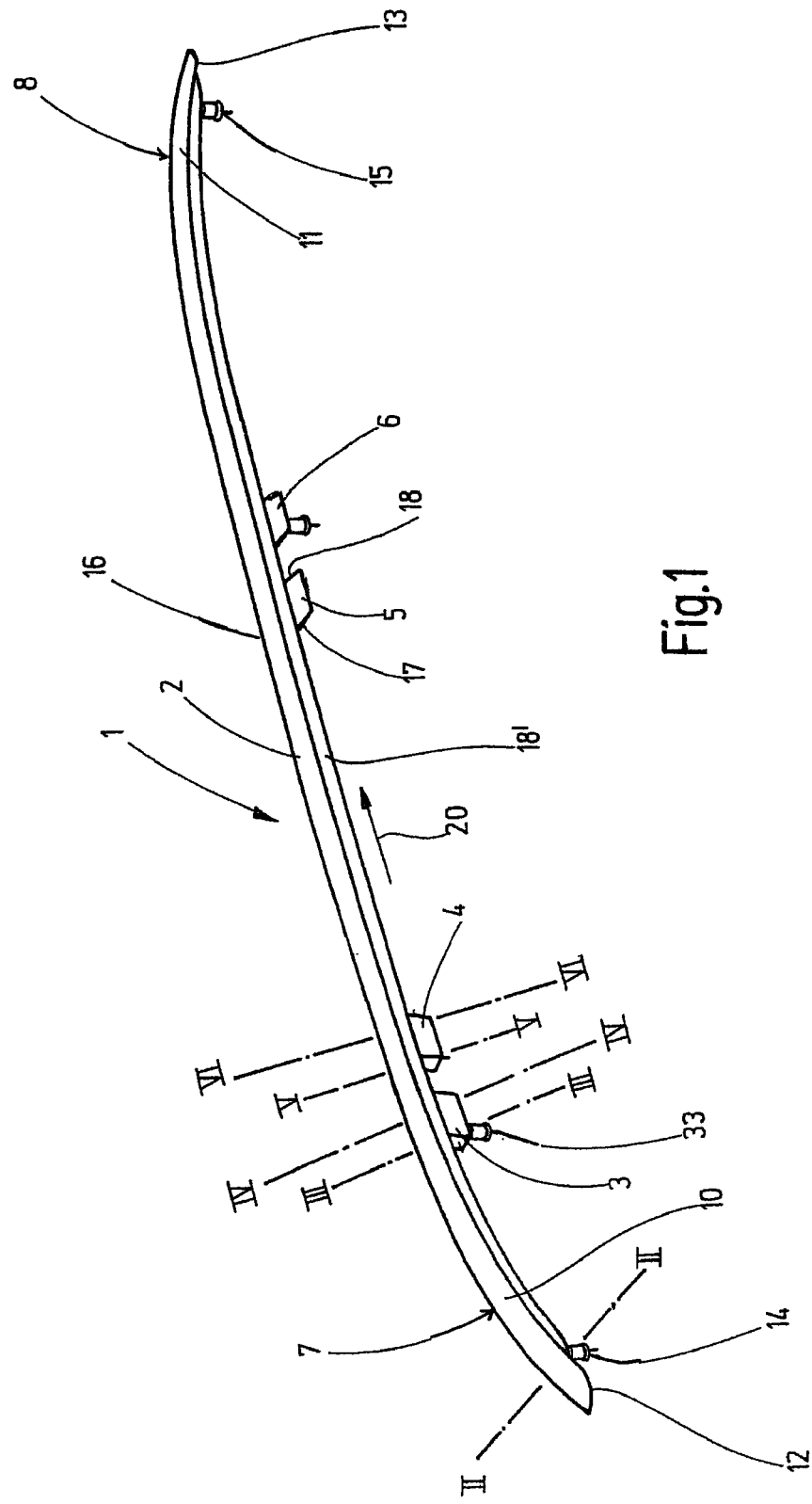

This application is a 371 U.S. National Stage of International Application No. PCT/EP2007/000933, filed Feb. 3, 2007. This application claims priority to German Patent Application No. DE 10 2006 012 050.7, filed Mar. 16, 2006, which application is herein expressly incorporated by reference.

FIELD

The invention relates to a roof railing for motor vehicles, comprising at least one rack bar and at least one support element associated with the rack bar, wherein the rack bar and support element are provided as separate components.

BACKGROUND

A roof railing of the aforementioned type is known, and is associated with the roof of a motor vehicle to allow loads to be attached. The known roof railing has a rack bar which extends over the length of the roof and which runs, at least in places, at a distance from the motor vehicle roof, and by means of which at least one support element located between the rack bar and the motor vehicle roof is supported. The rack bar and support element are provided as separate components, which preferably are fastened to one another. The support element is also preferably attached to the motor vehicle roof. The rack bar is preferably manufactured in an extrusion process. The at least one support element, which forms a base, is manufactured as a cast or forged part.

SUMMARY

The object of the invention is to provide a roof railing for motor vehicles of the aforementioned type which may be easily and economically manufactured and which has an attractive appearance.

This object is achieved according to the invention by the fact that the rack bar as well as the support element are provided as extruded components. By use of the procedure according to the invention the rack bar and support element may be produced very economically, since the same manufacturing process is used for both components.

The support element has a shape and contour which is specified by the extrusion process, i.e., constant cross-sectional contours in the extrusion direction. Since both components are subjected to the same manufacturing process they have the identical surface appearance, so that a roof railing manufactured according to the invention has a very uniform appearance. Since there are no variations in the surface structure a very homogeneous appearance results.

According to one refinement of the invention, the rack bar and the support element are made of the same material, in particular aluminum or an aluminum alloy. Use of the same material lowers inventorying and manufacturing costs, and provides advantages for the subsequent procedures, for example surface finishing, since the same processes may be used.

It is also advantageous when the rack bar and the support element have the same surface design on account of the identical surface treatment. Grinding, polishing, brushing, and anodizing processes and the like may be applied and performed in the same way for both components, i.e., for the rack bar and the support element, resulting in optimized production. For example, the electrolytic baths to be used for the anodizing process may have the same composition, so that additional baths for the various components are not necessary.

It is particularly advantageous for the support element to have at least one support step and for the rack bar to have at least one counter-support step for absorption of lateral force, wherein the support step and counter-support step contact one another. As the result of transverse acceleration of the motor vehicle, lateral forces are produced by the roof load acting on the roof railing, causing the rack bar to be stressed relative to the support element transverse to the direction of travel of the vehicle. As a result, besides forces which act in the direction of travel or opposite the direction of travel, corresponding lateral forces, i.e., transverse to the direction of travel, occur between the rack bar and the support element. In addition, the case may be that the support surfaces of the support element for the rack bar do not extend horizontally, but instead have a lateral slope. This slope often results from design or body specifications. In extreme cases of load alternation this contributes to "slippage" of the rack bar from the support element. The referenced support step, which cooperates with the counter-support step, produces a rear engagement so that, at a minimum, the two parts are in a form-fit connection in a transverse direction, for example toward the outside. A support step and counter-support step are also preferably provided in the corresponding opposite direction on the support element and the rack bar, so that in each case a rear engagement, and therefore a form-fit connection, results toward the outside, transverse to the direction of travel and toward the inside, transverse to the direction of travel.

It is particularly advantageous for the support step and/or the counter-support step to be extruded steps. The support step and/or the counter-support step are consequently produced in the extrusion process, as the result of which no additional machining is necessary to produce the support step or counter-support step.

The support step is preferably provided as at least one longitudinal projection, which is produced during the extrusion process. The longitudinal projection protrudes in the direction of the rack bar, and its longitudinal extension runs in the extrusion direction.

The counter-support step is preferably provided as at least one longitudinal groove. Here as well, the longitudinal groove is produced during the extrusion process, so that the longitudinal groove runs in the extrusion direction.

The rack bar preferably has curved end regions which form support feet. The two end regions thus approach the vehicle roof in an arched shape, the respective end of the rack bar being fastened to the vehicle roof. The design of the curved end regions is provided by extrusion by performing a bending, stretching-bending, or roll bending process on the rack bar. In the zone between the two curved end regions the rack bar has the previously mentioned distance from the vehicle roof, the distance being bridged by at least one support element. Multiple support elements, separated by a distance from one another and distributed over the length of the roof railing, and which support the rack bar are preferably used. Support elements may also be provided which are not necessary or which are necessary not just for load bearing, but which are also used, or are used only, out of appearance considerations. The subject matter of the invention also encompasses a mixed form, i.e., provision of at least one support element for load reasons and provision of at least one support element for appearance reasons.

The invention further relates to a method for manufacturing a roof railing for motor vehicles, in particular for producing a roof railing as previously described, wherein the roof railing has at least one rack bar and at least one support element associated with the rack bar, and the rack bar and the support element are manufactured as separate components in the extrusion process.

In particular it may be provided that for absorption of lateral force, at least one support step on the support element and at least one counter-support step on the rack bar are each produced in the extrusion process. In addition, the rack bar and the support element are subjected to the same surface treatment. In particular, both components are anodized, using the same electrolytic treatment baths.

DRAWINGS

Figure 2:
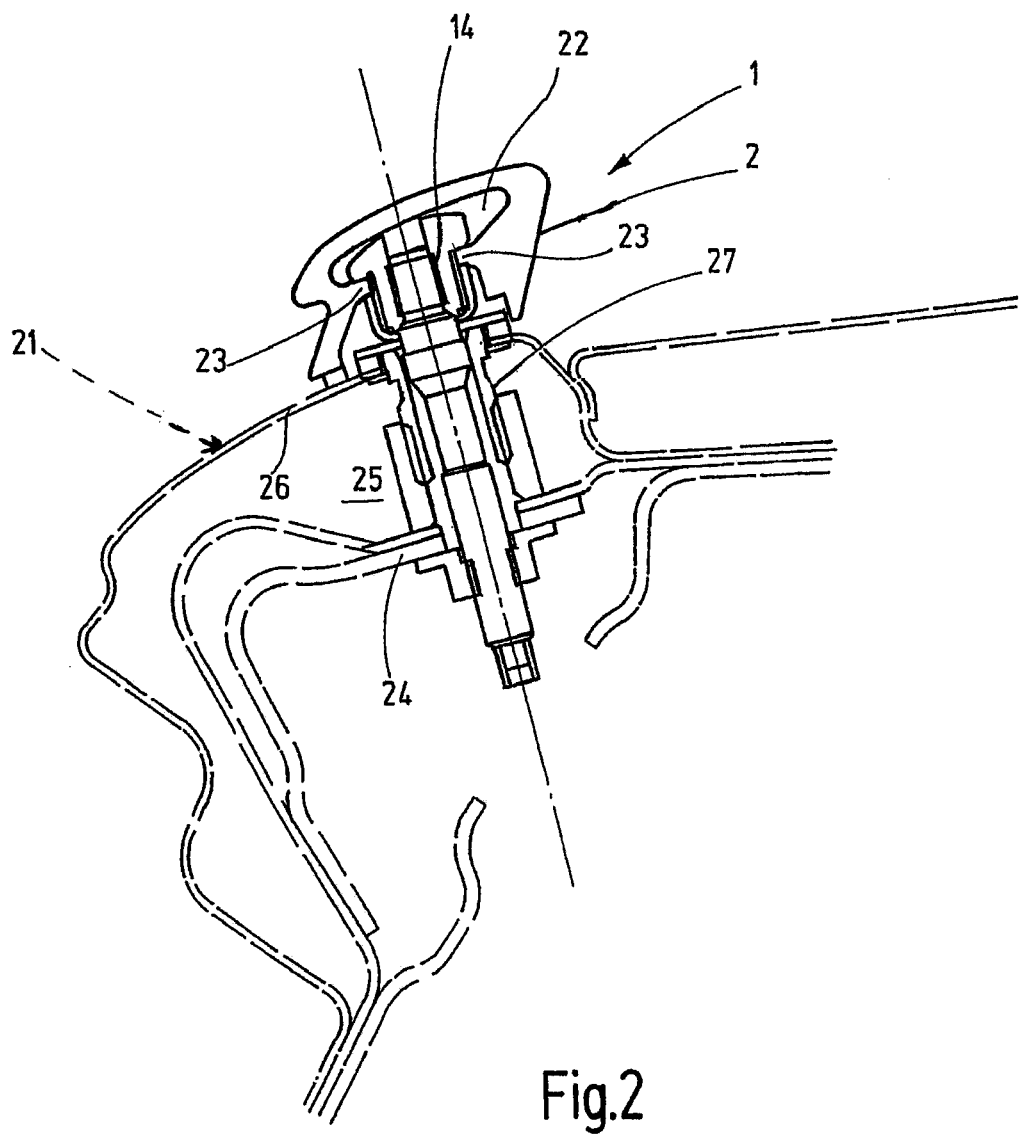
Figure 3:
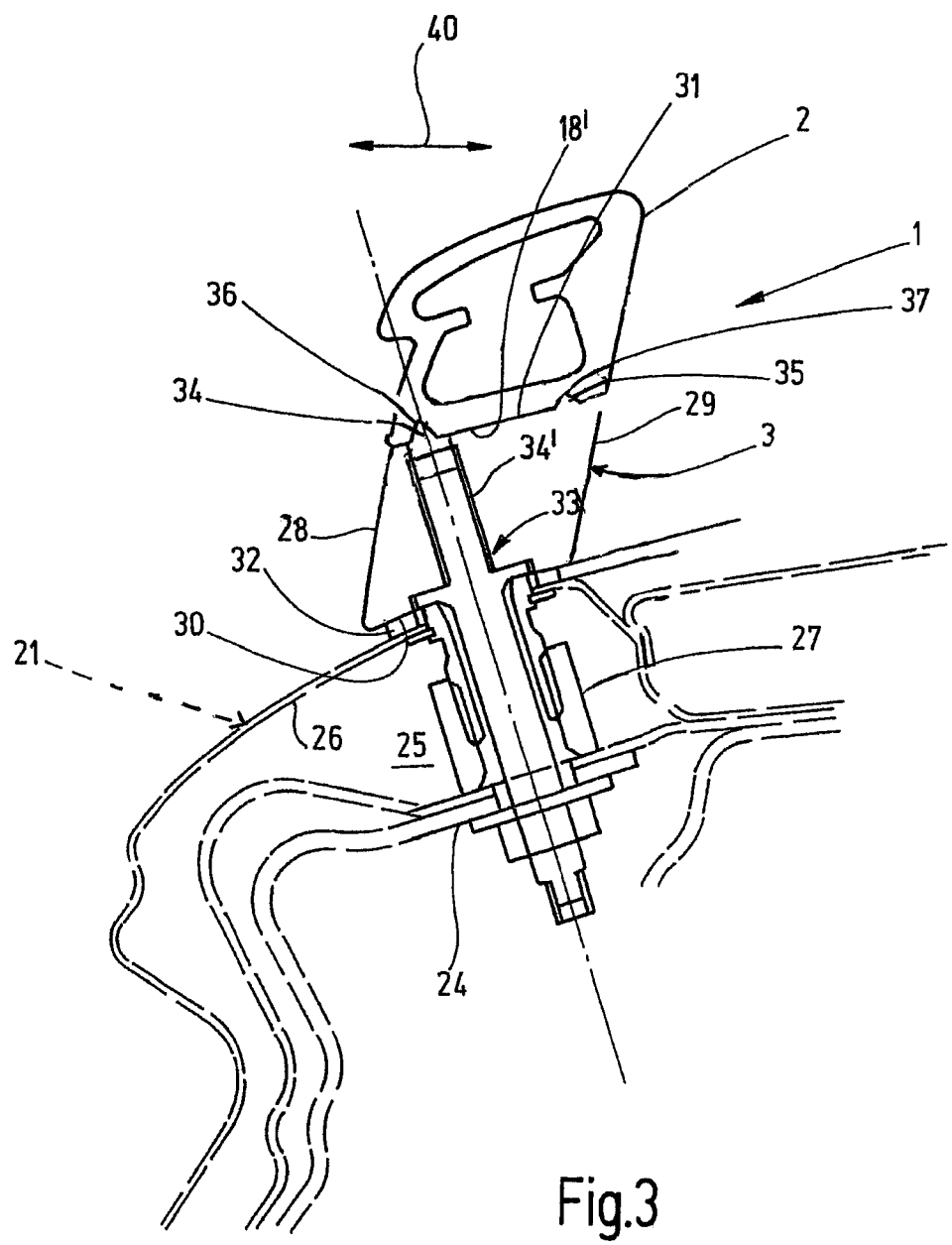
Figure 4:
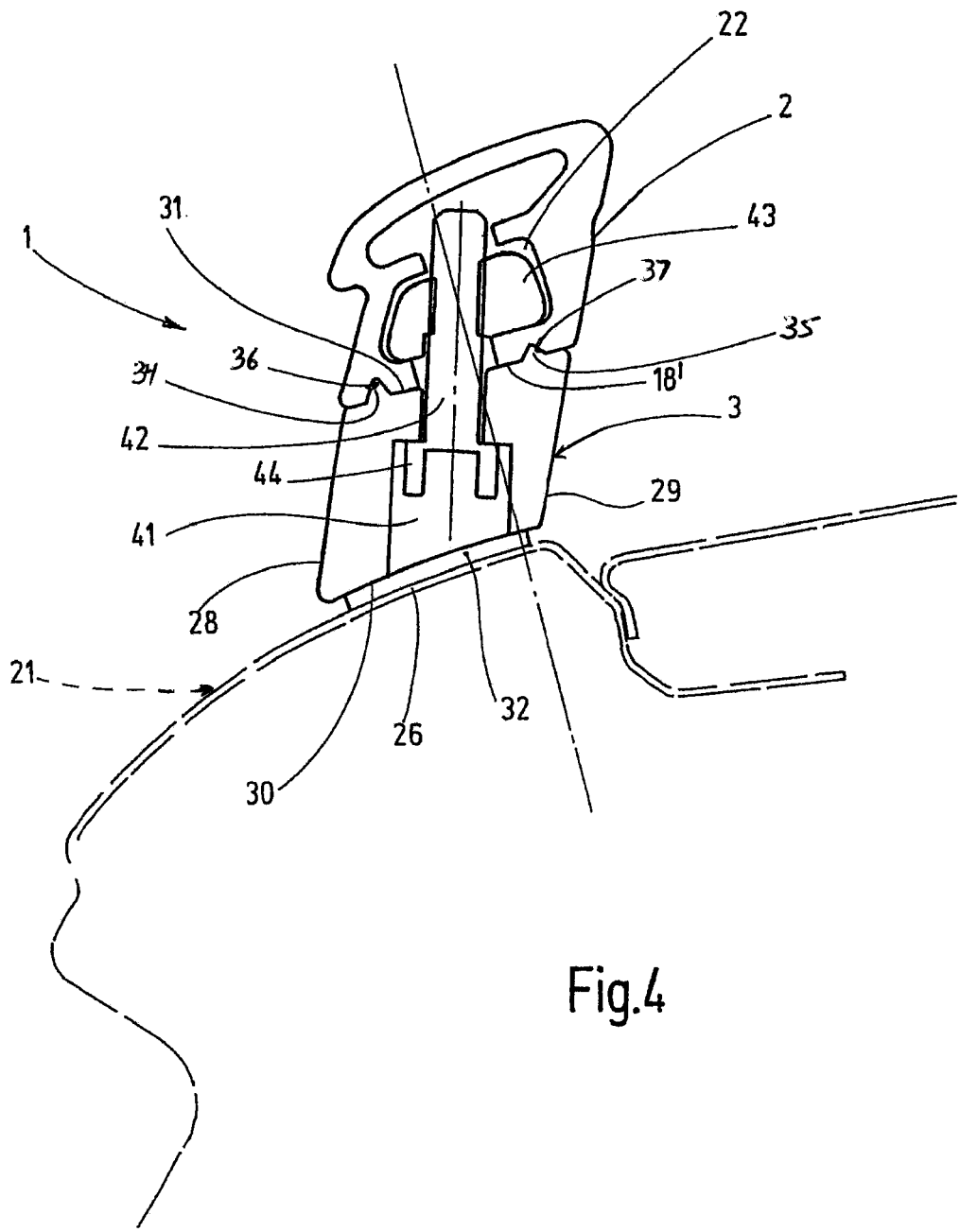
Figure 5:
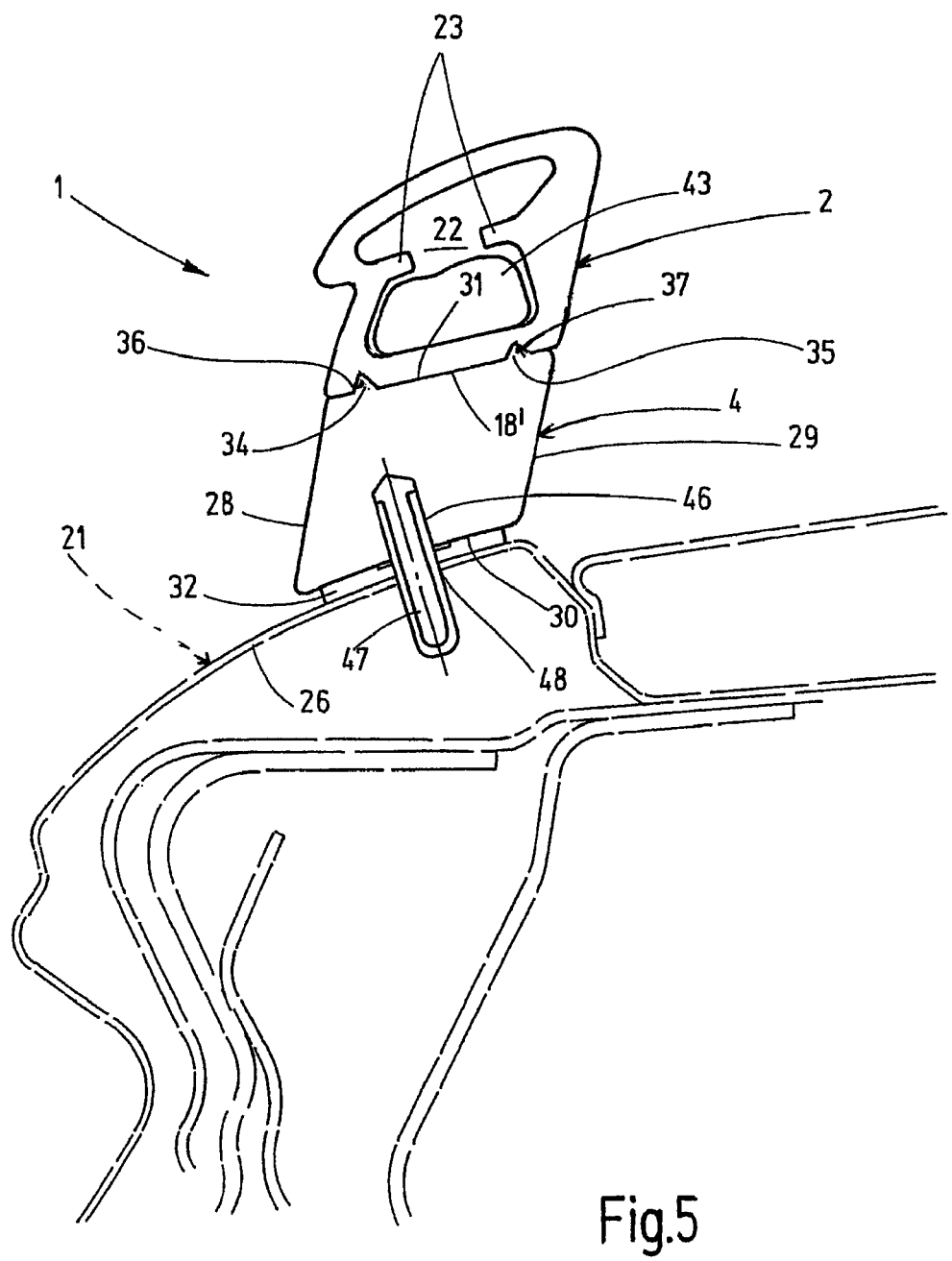
Figure 6:
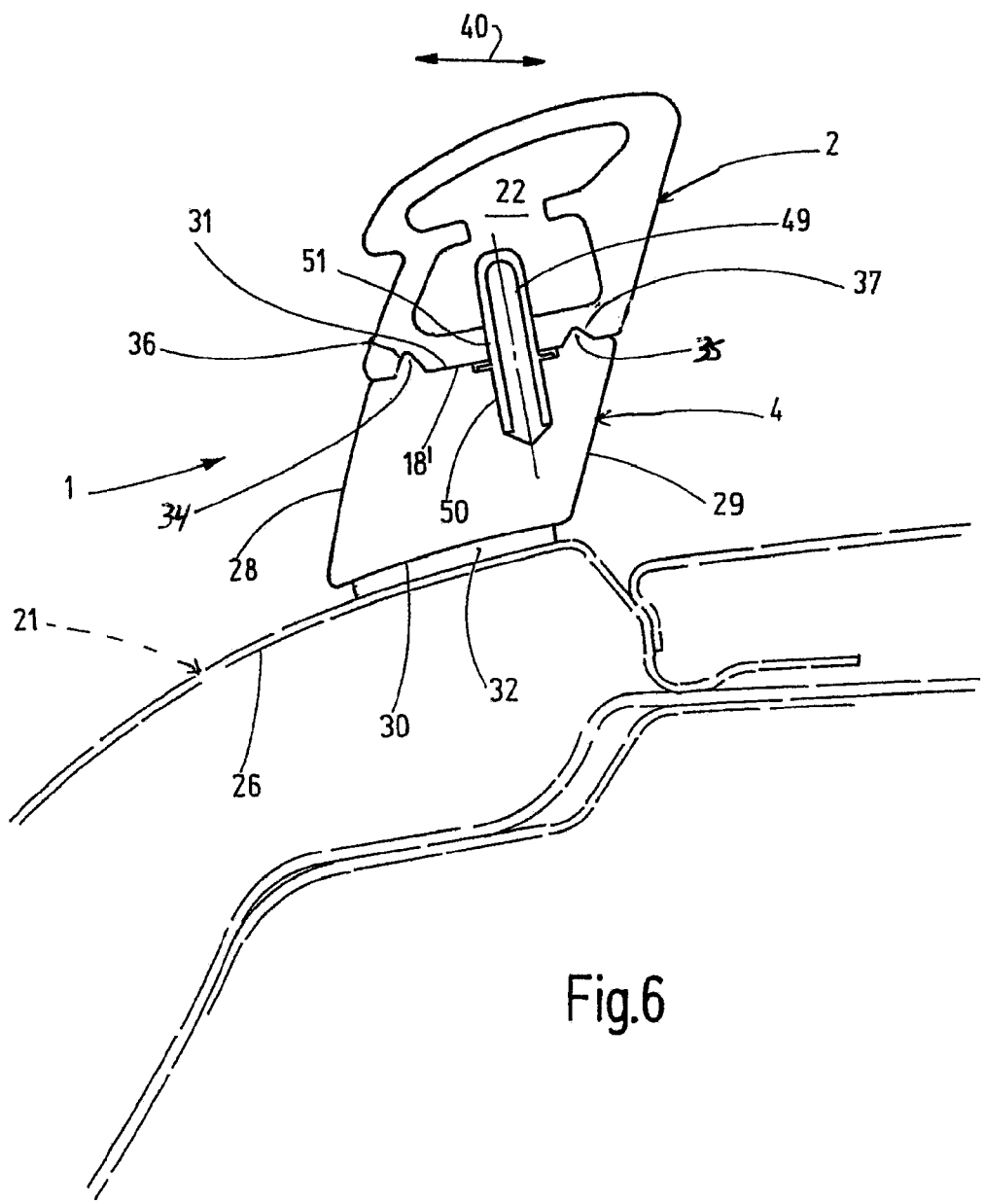

The invention is explained by means of the drawings, with reference to one exemplary embodiment. The drawings show the following:

FIG. 1 shows a perspective view of a roof railing for a motor vehicle;
FIG. 2 shows a cross section along line II-II in FIG. 1;
FIG. 3 shows a cross section along line III-III in FIG. 1;
FIG. 4 shows a cross section along line IV-IV in FIG. 1;
FIG. 5 shows a cross section along line V-V in FIG. 1; and
FIG. 6 shows a cross section along line VI-VI in FIG. 1.

DETAILED DESCRIPTION

FIG. 1 shows a roof railing 1 comprising a rack bar 2 and four support elements 3, 4, 5, and 6. One roof railing is preferably fastened to the roof of a motor vehicle in each of the two side regions. However, for the sake of simplicity only one roof railing 1 is described below. The rack bar 2 has curved sections 10 and 11 in its respective end regions 7 and 8, the ends 12 and 13 of the rack bar 2 extending to the motor vehicle roof, not illustrated in FIG. 1. Each end 12, 13 is provided with a fastening element 14, 15, respectively, to allow attachment to the motor vehicle roof.

Between the two curved sections 10 and 11 the rack bar 2 has a shape which in the longitudinal extension is modified approximately to the contour of the motor vehicle roof, and in this zone 16 (between sections 10 and 11) the rack bar extends at a distance from the vehicle roof. This distance is bridged by the four support elements 3 through 6, support elements 3 and 4 being situated a small distance apart and being associated with the end region 7, and support elements 5 and 6 being situated relatively close to another and being associated with the end region 8. It is shown that the end faces 17 and 18 of support elements 3 through 6 do not extend at right angles to the underside 18' of the rack bar 2, but instead, for design reasons are situated at an obtuse or acute angle relative to the underside 18'.

The rack bar 2 and support elements 3 through 6 are each manufactured as extruded components, the extrusion direction 20 being indicated in FIG. 1, i.e., for the rack bar the extrusion direction lying in the longitudinal extension, and for support elements 3 through 6 the extrusion direction likewise lying in the longitudinal extension, and in the installed state according to FIG. 1 the longitudinal extensions of support elements 3 through 6 running parallel to the longitudinal extension of the rack bar 2. After the rack bar 2 is extruded the end regions 7 and 8 are bent to obtain curved sections 10 and 11. Lastly, the ends 12 and 13 are produced by appropriate cutting. If the rack bar 2 is not linear in zone 16 but instead is likewise slightly curved in order to follow the roof contour of the motor vehicle, a bend is produced in this zone as well. The extruded support elements 3 through 6 are obtained by cutting corresponding extruded profiles, preferably solid profiles, into sections. If the rack bar 2 and support elements 3 through 6 are present as extruded semifinished products at this point, mechanical machining is performed to obtain fastening elements which are used to attach support elements 3 through 6 to the rack bar 2 and to allow the rack bar 2 and support elements 3 through 6 to be mounted on the automobile roof. A more detailed description is provided below.

The components present as extruded semifinished products are produced from the same material, preferably aluminum or an aluminum alloy, by extrusion. The following manufacturing processes may be carried out in an optimized manner since the rack bar as well as support elements 3 through 6 are subjected to the same surface treatment, namely, grinding, brushing, and/or polishing, followed by anodizing. Coating may be performed instead of or in addition to anodizing. On account of the same materials and the same manufacturing process by extrusion, after surface treatment the surfaces of the rack bar 2 and support elements 3 through 6 look exactly the same, resulting in a very harmonious appearance.

FIGS. 2 through 6 illustrate cross sections of the profile bar 2, or the profile bar 2 and the respective support element 3 through 6, in each case a section of a motor vehicle roof 21 also being shown. It can be seen that the rack bar 2 has been provided as a hollow profile having an inner cavity 22, the cavity 22 being produced during extrusion. Two projections 23 in the cavity 22 producing a cross-sectional constriction and likewise provided during extrusion are used to engage with the fastening element 14 (FIG. 2), which has a pin-shaped design and securely connects the rack bar 2 in the end region 7 to a retaining profile 24 situated inside the motor vehicle roof 21, an interspace 25 for the roof panel 26 being bridged by an adjustable spacer 27 for the fastening element 14.

The end region 8 has the same design as in FIG. 2, wherein fastening element 15 is used instead of fastening element 14. Therefore, reference is made to the descriptions for fastening element 14.

FIGS. 3 and 4 show cross sections of the roof railing 1 in the region of support element 3; FIGS. 5 and 6 show cross sections of the roof railing 1 in the region of support element 4. The cross-sectional design of support element 4 corresponds essentially to that of support element 3, and therefore reference is made to the corresponding descriptions. The cross-sectional design in the region of support element 5 essentially corresponds to that of FIGS. 5 and 6, and therefore reference is made to these figures and the associated text. The same applies to the cross-sectional design in the region of support element 6, which corresponds to the respective design of FIG. 3 or 4. In this regard, reference is made to these figures and to the text.

FIG. 3 shows that the rack bar 2 of the roof railing 1 is supported on the motor vehicle roof 21 by means of the support element 3. The support element 3 has sides 28 and 29 as well as an underside 30 and a top side 31. This results in an overall cross-sectional surface having the shape of a rhombus or a skewed square, the underside 30 being supported on the roof panel 26 with insertion of a seal 32, and a fastening element 33 being provided which is screwed from below, i.e., from the underside 30, into a threaded hole 34' in the support element 3, and being screwed to a retaining profile 24 with insertion of a spacer 27. In this manner the support element 3 is securely affixed to the motor vehicle roof 21. The top side 31 has two support step structures 34 and 35 which cooperate with respective counter-support step structures 36 and 37 provided on the underside 18' of the rack bar 2. The support step structures 34 and 35 each have a support step in the form of a longitudinal projection, the two longitudinal projections extending over the entire longitudinal extension of the support element 3 running in the direction of the longitudinal extension of the rack bar 2. The two longitudinal projections run in parallel at a distance from one another. The longitudinal projections, the same as sides 28 and 29 as well as underside 30 and top side 31, are produced during the extrusion process corresponding to the cross-sectional contour illustrated in FIG. 3. The counter-support step structures 36, 37 provided on the underside 18' of the rack bar 2 are designed as counter-support steps in the form of parallel longitudinal grooves 45 in which the longitudinal projections engage in a shape-adapted manner. The longitudinal grooves 45 are provided during extrusion of the rack bar 2. The teething of the rack bar 2 and support element 3 produced in this manner results in at least one form-fit connection which absorbs lateral forces (double arrow 40) running transverse to the longitudinal extension of the rack bar 2, without resulting in relative slippage of the rack bar 2 and support element 3. This form-fit connection also exists between the rack bar 2 and support elements 4, 5, and 6 in a corresponding manner. FIG. 4 shows the manner in which the rack bar 2 and support element 3 are joined together approximately in the direction of the longitudinal extension of the fastening element 33.

FIG. 4 shows that, adjacent to the fastening element 33 (compare FIGS. 1 and 3), a stepped borehole 41 is provided in the support element 3 in which a threaded screw 42 engages and which is screwed into a sliding block 43, provided with a threaded hole, located in the cavity 22 of the rack bar 2. The head 44 of the threaded screw 42 is supported on the smaller-diameter region of the stepped borehole 41, and is counter-sunk with respect to the underside 30.

A comparison of FIGS. 3 and 4 shows that the directions of the longitudinal progressions of the fastening element 33 and threaded screw 42 define an acute angle with respect to one another.

According to FIG. 1, support element 4 is located next to and at a distance from support element 3, whereby the former is provided only for appearance reasons and therefore need not be connected to the rack bar 2 and to the motor vehicle roof 21 in such a way that it can withstand high load. It is only important for the support element 4 to consistently maintain its position between the motor vehicle roof 21 and the underside 18' of the rack bar 2. For this purpose, according to FIG. 5 the support element 4 has a location hole 46 on its underside 30 for a stud bolt 47 which engages in a stud bolt hole 48 in the vehicle roof 21, in particular the roof panel 26. Support step structures 34 and 35, as previously described for FIG. 3, are provided for the support element 4 which cooperate with the counter-support step structures 36 and 37, as likewise previously described for FIG. 3. In addition, according to FIG. 6, a stud bolt 49 is provided at a distance from stud bolt 47 between the rack bar 2 and the support element 4, and is situated in a location hole 50 in the support element 4 and engages in a retaining hole 51 in the rack bar 2. The stud bolt 49 is not externally visible since it rests on the abutting surface of the top side 31 of the support element 4 and the underside 18' of the rack bar 2.

Additionally or alternatively, the support element 4 and rack bar 2 may be screwed together according to the design in FIG. 4. For this purpose, as indicated in FIG. 5 a sliding block 43 is situated in the cavity 22, although the associated threaded screw 42 is not visible in FIGS. 5 and 6 due to the position of the sectional illustration.

By use of the procedure according to the invention, a roof railing 1 is provided in which the rack bar 2 and support elements 3 through 6 may be economically manufactured with an identical appearance. In addition, a form-fit connection exists between the rack bar 2 and support elements 3 through 6 on account of the support step structures 34 and 35 and counter-support step structures 36 and 37.

As previously mentioned, the rack bar 2 and support elements 3 through 6 are manufactured as extruded aluminum or aluminum alloy profiles. As a result of the tongue-in-groove design between the rack bar 2 and the respective support element 3 through 6 on account of the referenced support step structures 34, 35 and counter-support step structures 36, 37, an optimal connection may be achieved which is provided during the respective extrusion process. Because the same manufacturing method and materials are used for the rack bar 1 and support elements 3 through 6, the subsequent process also has potential for optimization, since all components may be subjected to the same type of surface treatment, in particular for polishing and anodizing. For the anodizing process the same bath compositions may be used with identical production times. This results in very rapid and efficient manufacture with the same appearance. Body specifications for the motor vehicle and/or design specifications result in the "rotated" inclination shown in FIGS. 3 through 6; i.e., the rack bar 2 and support elements 3 through 6 do not lie horizontally flat on one another, but, rather, an inclined contact zone is present so that forces which occur result in correspondingly inclined components which would "favor" slippage. On account of the support step structures 34, 35 and counter-support step structures 36 and 37 according to the invention, optimal diversion of energy is provided, even under extreme cases of load alternation, so that a secure connection is always present. Furthermore, as a result of this design even extremely large forces may be easily diverted without endangering the roof load located on the roof railing 1.

The invention claimed is:
1. A roof railing for a motor vehicle comprising:
at least one rack bar monolithically formed to include two curved end regions forming support feet for engaging a roof of the motor vehicle; and
at least one rigid support element associated with the rack bar for bridging a distance between the rack bar and the vehicle roof in a zone between the two end regions;
wherein the at least one rack bar and the at least one support element are provided as separate components;
wherein the support element has two support steps that are triangular in cross section and the rack bar has two counter-support steps for receiving the support steps and for absorption of a lateral force, the support steps and the counter-support steps contacting one another, each support step provided in the form of a longitudinal projection protruding toward the rack bar, both longitudinal projections extend over an entire longitudinal extension of the support element running in the direction of the longitudinal extension of the rack bar and run in parallel at a distance from one another the counter-support steps provided on an underside of the rack bar in the form of parallel longitudinal grooves in which the longitudinal projections engage in a shape-adapted manner.
2. The roof railing according to claim 1, wherein the rack bar and the support element are made of the same material.
3. The roof railing according to claim 1, wherein the rack bar and the support element have the same surface design as a result of an identical surface treatment.
4. The roof railing according to claim 1, wherein the support element includes a generally flat upper surface and the first and second support steps upwardly extend from the generally flat upper surface, the support elements spaced from lateral edges of the generally flat upper surface.

5. A roof railing for a motor vehicle comprising:
a rigid support element including a generally flat upper surface and first and second support steps upwardly extending from the upper surface, each support step in the form of a projection extending longitudinally at least substantially along an entire longitudinal length of the respective support step and having a triangular cross section, the first and second support steps being parallel to one another; and
a rack bar associated with the support element, the rack bar including first and second counter-support steps matingly receiving the first and second support steps, respectively, the first and second counter-support steps provided on an underside of the rack bar and each in the form of a parallel longitudinal groove corresponding in shape to the respective support step;
wherein the support steps and counter-support steps cooperate to absorb a lateral force;
wherein the rack bar is monolithically formed to include two end regions which form support feet for engaging a roof of the motor vehicle, the rigid support element for bridging a distance between the rack bar and the vehicle roof in a zone between the two end regions.

6. The roof railing according to claim 5, wherein the rack bar and the support element are made of the same material.

7. The roof railing according to claim 5, wherein the rack bar and the support element are made of aluminum or an aluminum alloy.

8. The roof railing according to claim 5, wherein the rack bar and the support element have the same surface design as a result of an identical surface treatment.

9. The roof railing according to claim 5, wherein the end regions monolithically formed with the rack bar are curved end regions.

10. The roof railing according to claim 5, wherein the first and second counter-support steps define triangular openings.

11. The roof railing according to claim 5, wherein the support element includes a generally flat upper surface and the first and second support steps upwardly extend from the generally flat upper surface, the support elements spaced from lateral edges of the generally flat upper surface.

12. The roof railing for a motor vehicle of claim 1, in combination with the vehicle, wherein the lateral force absorbed by the support steps and counter-support steps are transverse to a direction of travel of the vehicle.

13. The roof railing for a motor vehicle of claim 1, further comprising:
a sliding block located in a cavity of the rack bar; and
a fastener threadably engaging the sliding block to couple the rack bar and the at least one rigid support element.

* * * * *

UNITED STATES PATENT AND TRADEMARK OFFICE
CERTIFICATE OF CORRECTION

Page 1 of 1

PATENT NO. : 8,534,517 B2
APPLICATION NO. : 12/224519
DATED : September 17, 2013
INVENTOR(S) : Hans Binder and Ottmar Binder It is certified that error appears in the above-identified patent and that said Letters Patent is hereby corrected as shown below:

On the title page item (73), line 2, Assignee:

Oberflachenverdelung should be --Oberflachenveredelung--

Signed and Sealed this
Tenth Day of December, 2013

Margaret A. Focarino
*Commissioner for Patents of the United States Patent and Trademark Office*